United States Patent Office 3,322,181
Patented May 30, 1967

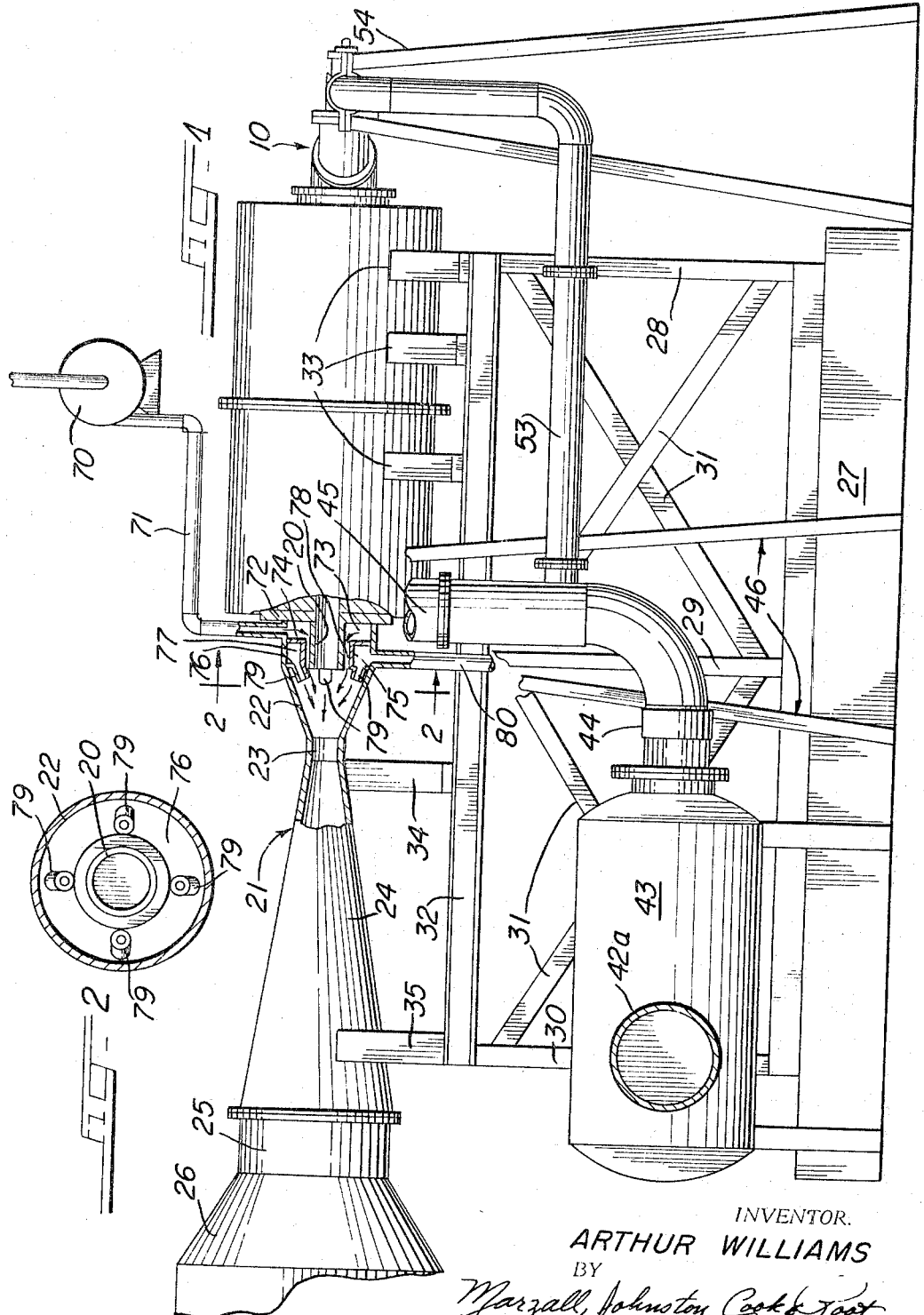

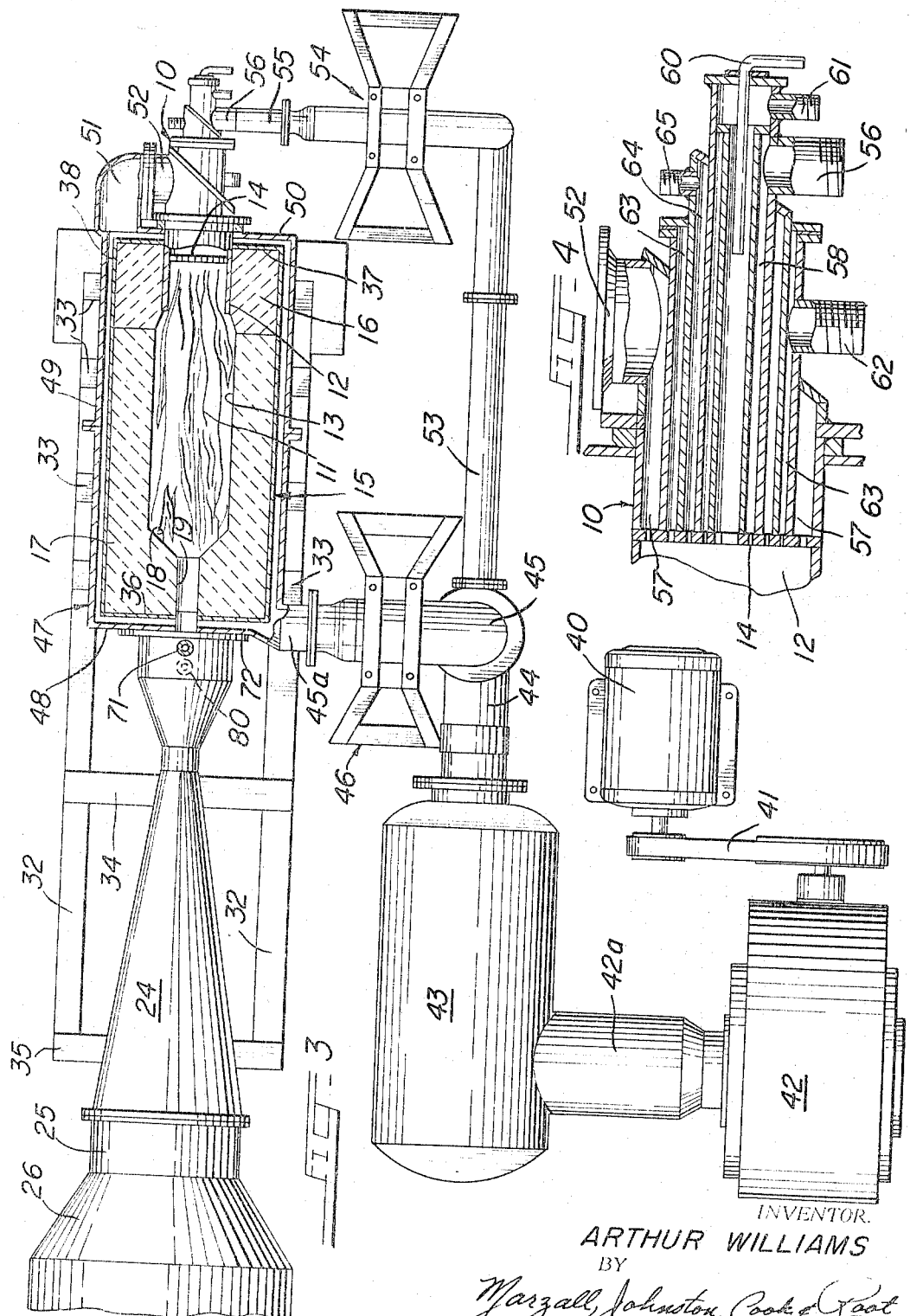

3,322,181
DIRECT HEAT EXCHANGE APPARATUS WITH REFRACTORY-LINED COMBUSTION CHAMBER
Arthur Williams, Munster, Ind., assignor to Selas Corporation of America, Dresher, Pa., a corporation of Pennsylvania
Filed Nov. 3, 1965, Ser. No. 506,248
4 Claims. (Cl. 159—4)

This application is a continuation-in-part of my copending applications Ser. Nos. 369,528, filed May 22, 1964, and 379,230, filed June 30, 1964, now U.S. Patent No. 3,247,890, issued Apr. 26, 1966.

This invention pertains to apparatus for effecting direct heat exchange between hot combustion gases and a liquid by the injection of the liquid into a stream of the hot gases. This invention particularly pertains to improvements embodying a refractory-lined combustion chamber on the downstream end of the burner and to a shell surrounding the combustion chamber in spaced relationship thereto to provide an annular passage therebetween. Combustion supporting air or oxygen is fed through said annular passage adjacent the downstream end of the combustion chamber and is withdrawn therefrom adjacent the upstream end of said combustion chamber, whereupon the withdrawn, preheated, combustion supporting air or oxygen is fed to the burner. In a preferred form of the invention, the burner comprises concentric, inner and outer burners wherein said preheated combustion supporting air or oxygen is fed to the oxygen supply passage for the outer burner.

Apparatus as disclosed herein is useful as liquid heating, liquid evaporating and liquid concentrating apparatus. The illustrated apparatus is especially useful in the concentration of heat sensitive chemical products, e.g., heat sensitive food products.

Briefly, this invention is concerned with improvements in the combustion zone for direct heat exchange apparatus of many types. The combustion chamber is lined with refractory material such as refractory brick because of the high temperatures created therein by the burning gases. It has been found that refractory-lined combustion chambers of the types illustrated in my aforesaid copending applications require a substantial thickness of refractory material, particularly where the burners used in association therewith have very high B.t.u. output, e.g., in the order of 15,000,000 B.t.u. per hour and up. The refractory brick or other refractory lining must have sufficient thickness to insulate the hot combustion zone therein from the outer part of the combustion chamber to prevent the development of excessively high and structurally damaging temperatures in the metal, outer shell of the combustion chamber.

It has been discovered, in accordance with the invention herein, that the required thickness of the refractory brick work or other refractory liner may be considerably less if the combustion chamber is one having a combustion shell, the inner wall of which is lined with the refractory brick or other refractory material, and a second shell is provided in spaced, surrounding relationship to the combustion shell. Pressurized air or oxygen such as that supplied by a blower is fed into the annular passage between the two shells adjacent the downstream end of the combustion chamber. It flows through the annular passageway and is taken off adjacent the upstream end of the combustion chamber. This air, which is preheated in its flow through the annular passage, is fed to the burner. In burners having very high B.t.u. output of the character previously described, large volumes of air or oxygen are required. Hence, large volumes of air or oxygen are fed through the annular passage. With dual burners of the type disclosed in U.S. Patent No. 3,192,920, the air supplied through the annular passage may be fed to one or both of the burners.

In a typical example, the refractory brick liner of a combustion chamber used in association with a burner having a 34,000,000 B.t.u. per hour output had a required thickness in the order of 12 to 16 inches. On the other hand, a combustion chamber having an annular passage in the order of ¾ inch spacing between the combustion shell and the second shell and operated in association with the same burner required a refractory brick work liner of only about 4 inches thickness.

Accordingly, it is a primary object of this invention to provide improvements in refractory-lined combustion chambers used in association with combustion burners, especially combustion burners of very high B.t.u. output. A further object of the invention is to provide combustion chambers composed of a refractory-lined combustion shell and a concentric, spaced, second shell providing an annular passage between the shells, through which passage is fed combustion-supporting air or oxygen for the burner. Still another object of the invention is to provide improvements in refractory-lined combustion chambers by utilizing supply air or oxygen for a burner operated in association with the combustion chamber for the purpose of mitigating the adverse effects of high temperatures in the combustion zone of the chamber by passing the air across the outer shell of the combustion chamber and withdrawing heat therefrom.

The foregoing and numerous other important objects, advantages and inherent functions of the invention will become apparent as the same is more fully understood from the following description, which, takin in connection with the accompanying drawing, discloses a preferred embodiment of the invention.

In the drawing:

FIGURE 1 is a side elevation, partly broken away and partly in section, of this preferred embodiment of apparatus of the invention;

FIG. 2 is a section taken on section plane 2—2 of FIG. 1;

FIG. 3 is a top plan view, partly broken away and partly in section, of the embodiment; and FIG. 4 is a section taken on a diametric plane of the illustrated, dual burner of the embodiment.

Referring to the drawings, the apparatus comprises a burner 10 adapted to burn a combustible gas such as natural gas and oxygen or air. The hot combustion gases 11 burn in and flow through a tubular extension 12 of the burner which extends beyond the burner plate 14. The supplied natural gas and oxygen or air ignite in the vicinity of burner plate 14, emitting hot combustion gases into the cylindrical combustion chamber 13.

The combustion chamber 13 comprises a combustion chamber shell 15, a ring-shaped refractory lining 16 at its upstream end around the tubular extension 12 of the burner 10 and another refractory liner 17 lining the cylindrical wall of the combustion chamber shell 15 as well as the downstream end thereof. The downstream portion of the refractory liner 17 has a frusto-conical wall 18, by which the combustion chamber defined by the liners 16 and 17 tapers to a small, hot combustion gas discharge or exit opening 19 centrally positioned in the downstream portion of the combustion chamber shell 15.

The hot combination gases are discharged through the opening 19 and pass into a cylindrical discharge tube 20 coaxial with opening 19. The hot combustion gases are discharged therefrom as a central stream into the direct heat exchanger 21. The heat exchanger 21 comprises a frusto-conical tubular part 22 tapering in the downstream direction of gas flow to a relatively narrow throat 23. The exchanger then flares outwardly in the downstream direction into the frusto-conical tubular portion 24. The downstream end of the frusto-conical, tubular portion 24 is coupled by a coupling duct portion 25 to a separator 26 for effecting separation of liquid from incondensible gases, the liquid having been injected into the hot gas stream in exchanger 21 by means later described.

The separator 26 may be of any suitable design and is not illustrated in detail. It may comprise, for example, a cyclone-type separator of the type illustrated in the aforesaid copending applications.

The burner, combustion chamber and direct heat exchanger are supported on a base 27 by a frame-work support comprising upstanding posts or legs 28, 29 and 30 braced by cross braces or bars 31. These posts or legs support a pair of elevated I-beams 32 across which extend saddles 33, 34 and 35. The saddles 33 cradle and support the combustion chamber and the burner 10 mounted thereon. Saddles 34 and 35 cradle and support the direct heat exchanger 21.

Combustion supporting air to be fed to the burner 10 is supplied by a blower 42 driven by the motor 40, which is connected to the blower 42 by the belt and pulley drive 41. The air discharged from blower 42 is fed via duct 42a into a plenum tank 43. The air is then conveyed by ducts 44 and 45, the latter being supported by the support frame 46, into a connecting duct 45a, which is mounted on a second, outer shell 47 positioned concentrically about the combustion chamber shell 15 in spaced relation therewith. The shell 47 has an end wall 48 in spaced relation to the end wall 36 of the combustion chamber. It has a cylindrical wall 49 in concentric, spaced relation to the cylindrical wall 38 of the combustion chamber shell. Its other end wall 50 is in spaced relation to the upstream, end wall 37 of the combustion chamber shell.

Therefore, the air which is supplied into the connecting duct 45a enters the space between the two shells adjacent the downstream end of the combustion chamber and may flow through the space between the downstream end walls 36 and 48, the annular space between the cylindrical walls 38 and 49, and also the space between the upstream end walls 37 and 50 toward a take-off duct 51 adjacent the upstream end of the combustion chamber. The take-off duct 51 is coupled to a flange coupling 52 on the side of the burner 10.

The duct 44 has connected therewith a secondary, take-off duct 53 supported by the support frame 54 and coupled by a connecting duct 55 to a coupling 56 on the burner 10. The burner 10 is a dual burner of the type described and illustrated in U.S. Patent No. 3,192,920, issued July 6, 1965. It comprises a concentric series of tubes defining therebetween annular passages for air and combustible gas. As a unit, the burner 10 comprises a dual burner in the sense that it has an inner burner and an outer burner in concentric relationship. The outer burner comprises an annular air passage 57 and a combustible gas passage 63. The inner burner comprises the annular air passage 58 and the annular combustible gas passage 64.

The burner has a centrally disposed pilot tube to which is supplied the pilot, combustible gas through the pipe 60. The combustion supporting air is supplied via the tubular coupling 61. The pilot is used to ignite the inner burner. The air supplied to the inner burner is the air flowing through the take-off duct 53 and into the radial innermost passage 58 of the burner 10 via the tubular coupling 56. The combustible gas for the inner burner is supplied through the tubular coupling 65 into the next annular passage 64. The air and gas issues through the ports in the burner plate 14, whereupon it is ignited.

The inner burner, in turn, may be used to ignite the outer burner. The air for the outer burner comes from the coupling 51 after passage between and preheating in the spaces between the combustion chamber shell 15 and its end walls and the second, outer shell 47. It flows through the radially outermost passage 57 while the combustion supporting gas for the outer burner is supplied via the tubular coupling 62 to the next adjacent annular passage 63. The air and combustible gases issue from the corresponding discharge ports in the burner plate 14 and thereafter ignite. For further details of the burner 10, reference is made to the aforesaid patent.

It will be appreciated that the burner 10, when both the inner burner and the outer burner are operating, may have a very high B.t.u. output capacity. Such high B.t.u. output consumes extremely large gas volumes, particularly where the oxygen-containing gas is air, approximately 80% of which is incombustible nitrogen. These burners require roughly a minimum of 10,000 cubic feet per hour of air for every million B.t.u. per hour output. A burner operating at 15,000,000 B.t.u. per hour, for example, requires a minimum of about 150,000 cubic feet per hour of air.

It will be appreciated, therefore, that these large volumes of air can be utilized in whole or in part for withdrawing heat from the outer side of the combustion chamber shell 15 to keep the temperature of the combustion chamber in the vicinity of the shell 15 at a much lower temperature than would be the case if such air were not utilized. In the illustrated embodiment, only the air supplied to the outer burner, which ordinarily handles a larger volume of air per hour than the inner burner, is passed in heat exchange relationship with the outer side of the shell 15. It is contemplated, however, that all of the air supplied to the burner 10 may pass in such heat exchange relationship, in which case the take-off duct 53 would be omitted. Then tubular coupling 56 would be connected with the air flowing in this heat exchange relationship with the shell 15.

The details of the structure for feeding the liquid into the hot gas stream emitted from the nozzle 20 into the tapered segment 22 of the heat exchanger 21 is of the type described and claimed in the aforesaid application Ser. No. 379,230. This apparatus is particularly designed for use with heat sensitive liquids. The hot combustion gases emitted into the direct heat exchanger 21 are surrounded by an annular stream of cooler gas by providing a pump or fan 70 for drawing atmospheric air or cooled, separated combustion gases drawn from separator 26 and forcing it through the conduit 71 into the liquid supply zone at the upstream end of the tapered section 22 of the direct heat exchanger 21. The upstream end of the tapered section 22 comprises a base plate 72 mounted on the downstream end of the combustion chamber. It has a ring-shaped passage 73 defined by a ring-shaped wall 74 and the base plate 72, into which passage is supplied the cooling air or gas from the pipe 71. This cooling air or gas flows through the annular space 78 defined by the outer side of the hot gas exit nozzle 20 and the cylindrical wall 75 in surrounding relationship to the hot gases exiting from nozzle 20.

The ring-shaped wall 74 and the ring-shaped wall 76, together with the cylindrical wall 75, provide a concentric, annular, manifold passage 77 into which is supplied the liquid to be injected in direct heat exchange relationship with the gases in the direct heat exchanger 21. This liquid is supplied via the pipe 80 into the annular manifold passage 77, from which it is discharged via nozzles 79 in the form of sprays or jet streams. The nozzles 79 are directed so that the liquid streams or sprays converge adjacent and upstream the region of the throat 23.

In apparatus in which temperature amelioration of the hot gases discharged into the direct heat exchanger 21 is not the important factor, e.g., when the liquid to be heated, concentrated or evaporated is not heat sensitive, the supply of secondary, cooling gas about the nozzle 20 via annular space 78 may be omitted. In such case, the liquid may be fed into the direct heat exchanger in the manner illustrated in the aforesaid application Ser. No. 369,528.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Apparatus adapted for the concentration of liquids by direct heat exchange with hot combustion gases comprising a burner for burning air or oxygen and a combustible fuel, a combustion shell on the downstream end of said burner, a refractory lining in said shell, said shell and lining having a hot combustion gas discharge opening at the downstream end thereof, a direct heat exchange tube at the downstream end of said shell and coaxial therewith and in communication with said opening for feed of hot combustion gases into said tube, means adjacent said opening for feeding a liquid to be concentrated into the hot combustion gases flowing through said tube to provide direct heat exchange therewith, a second shell extending about and in spaced relationship to said combustion shell to define an annular passage therebetween, means for feeding air or oxygen to the end of said passage adjacent the downstream end of said combustion shell, means adjacent the upstream end of said combustion shell for withdrawing said air or oxygen after flow through said annular passage and for feeding the withdrawn air or oxygen to said burner, and means to supply a combustible fuel to said burner.

2. In the combination of a burner for burning air or oxygen and a combustible fuel and a refractory-lined combustion shell on the downstream end of said burner, the improvement comprising a second shell about said combustion shell in spaced relationship thereto defining an annular passage therebetween, spaced end walls on the downstream end of said shells spaced apart and defining an end passage at the downstream end of said shells in communication with the downstream end of said annular passage for flow of air or oxygen across the downstream end of said combustion shell, conduit means connected to said second shell at the downstream end thereof for supplying air or oxygen to said end passage and the downstream end of said annular passage, and means adjacent the upstream end of said combustion shell for withdrawing said air or oxygen after flow through said annular passage and for feeding the withdrawn air or oxygen to said burner.

3. In the combination of a burner for burning air or oxygen and a combustible fuel and a refractory-lined combustion shell on the downstream end of said burner, the improvement comprising a second shell about said combustion shell in spaced relationship thereto defining an annular passage therebetween, means for feeding air or oxygen to the end of said passage adjacent the downstream end of said combustion shell, means adjacent the upstream end of said combustion shell for withdrawing said air or oxygen after flow through said annular passage and for feeding the withdrawing air or oxygen to said burner, concentric tubes defining an inner burner with an annular, combustible gas passage and annular, air or oxygen passage and also defining an outer burner with an annular, combustible gas passage and an outermost, annular, air or oxygen passage, said last mentioned means feeding said air or oxygen to said last mentioned passage, and additional feed means for feeding air or oxygen to said annular, air or oxygen passage of said inner burner.

4. The improvement as claimed in claim 3 wherein said shells respectively have end walls spaced from each other and defining passages at opposite ends of said shells in communication with the respective ends and said annular passage.

References Cited
UNITED STATES PATENTS

| | | | |
|---|---|---|---|
| 1,722,175 | 7/1929 | Bowen | 159—4 X |
| 2,007,230 | 7/1935 | Wade | 158—36 |
| 2,716,330 | 8/1955 | Way | 158—36 |
| 2,752,912 | 7/1956 | McCracken | 158—36 |
| 2,934,410 | 4/1960 | Smith | 23—277 |
| 2,985,438 | 5/1961 | Prowler | 158—36 |
| 3,037,939 | 6/1962 | Andrews | 252—305 |

FOREIGN PATENTS
406,291  2/1934  Great Britain.

NORMAN YUDKOFF, *Primary Examiner.*

J. SOFER, *Assistant Examiner.*

UNITED STATES PATENT OFFICE

CERTIFICATE OF CORRECTION

Patent No. 3,322,181                                May 30, 1967

Arthur Williams

It is hereby certified that error appears in the above numbered patent requiring correction and that the said Letters Patent should read as corrected below.

Column 1, line 11, after "1964," insert -- now U. S. Patent No. 3,275,062, issued September 27, 1966, --; column 4, lines 37 and 38, strike out "application Ser. No. 379,230" and insert instead -- U. S. Patent No. 3,247,890 --; lines 74 and 75, strike out "application Ser. No. 369,528" and insert instead -- U. S. Patent No. 3,275,062 --; column 5, lines 26 to 28, strike out "means for feeding air or oxygen to the end of said passage adjacent the downstream end of said combustion shell" and insert instead -- spaced end walls on the downstream end of said shells spaced apart and defining an end passage at the downstream end of said shells in communication with the downstream end of said annular passage for flow of air or oxygen across the downstream end of said combustion shell, conduit means connected to said second shell at the downstream end thereof for supplying air or oxygen to said end passage and the downstream end of said annular passage, --; column 6, line 37, for "McCracken" read -- MacCracken --.

Signed and sealed this 3rd day of September 1968.

(SEAL)
Attest:

EDWARD M. FLETCHER, JR.                    EDWARD J. BRENNER
Attesting Officer                            Commissioner of Patents